L. C. BLOMSTROM.
SCREW THREAD MICROMETER.
APPLICATION FILED JAN. 7, 1918.

1,300,692.

Patented Apr. 15, 1919.

WITNESSES:

M. Broesamle

INVENTOR

L. C. Blomstrom

BY
B. G. Wheeler
ATTORNEY

UNITED STATES PATENT OFFICE.

LOWELL C. BLOMSTROM, OF DETROIT, MICHIGAN.

SCREW-THREAD MICROMETER.

1,300,692.	Specification of Letters Patent.	Patented Apr. 15, 1919.

Application filed January 7, 1918.   Serial No. 210,627.

*To all whom it may concern:*

Be it known that I, LOWELL C. BLOMSTROM, a citizen of the United States, residing at Detroit, in the county of Wayne and State of Michigan, have invented a new and useful Screw-Thread Micrometer, of which the following is a specification.

This invention relates to micrometer calipers especially adapted for gaging screw-threads, and its object is to provide a micrometer caliper that may be readily set to any desired screw pitch diameter without the necessity of calculations or consultation of special tables, thus effecting a considerable saving of time as compared to instruments heretofore employed for a like purpose.

In attaining this object the invention contemplates associating with the barrel and spindle of a micrometer caliper two relatively adjustable rotatable members, one carrying the usual circular scale, supplementing a linear scale on the barrel, and the other being rigidly connected with the spindle, a helical scale being provided upon one of said members indicating various screw pitches for which the instrument is set by a proper relative adjustment of the two members determined by reference to said helical scale, the two members being rotated in unison correspondingly to the thimble of an ordinary micrometer caliper when being set for a given outside or point diameter of screw threads.

This object is attained by a construction which is illustrated in a preferred embodiment by the accompanying drawings, wherein, Figure 1 is a view in side elevation of said preferred embodiment of the invention, the same being shown engaged with the threads of a screw.

Figure 1:
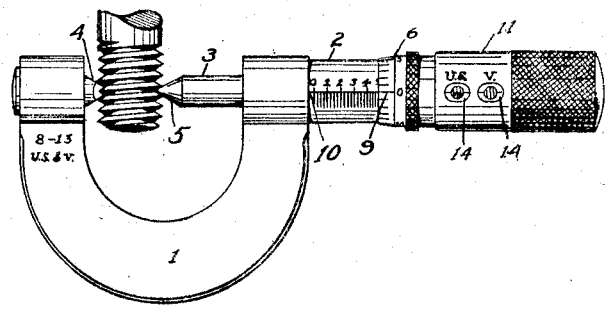
Figure 2:
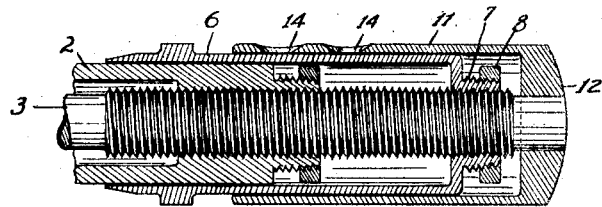
Fig. 2 is an enlarged axial section, omitting the yoke portion, and showing the engagement of the spindle with the barrel and with the two relatively adjustable members.
Figure 3:
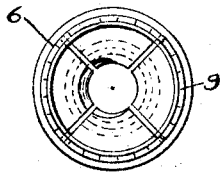
Figs. 3 and 4 are respectively an end and a side view of the inner of the two relatively adjustable members whereby the instrument is adapted to be set.
Figure 4:
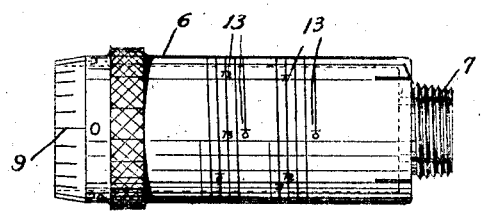

In these views the reference character 1 designates the yoke, 2 the barrel and 3 the spindle screw-threaded into the barrel, these parts in their broad relation being standard in micrometer calipers. The bolt or screw to be gaged will be engaged between a double-toothed anvil 4 and the tapered end 5 of the spindle, as seen in Fig. 1. The barrel extends into a sleeve 6 which at its rear extremity is formed with a collar 7 engaging the threads of the spindle, and having a snug friction fit therewith so that said sleeve and spindle will tend to turn in unison when rotation is applied to either, unless restraint is put upon one of said members. In order that the intensity of frictional engagement between the collar 7 and spindle 3 may be regulated, said collar is split, and exteriorly tapered and threaded to be engaged by a binding nut 8. At its front end the sleeve 6 is beveled and provided with a circular scale 9, having the usual supplemental relation to a linear scale 10 upon the barrel. The rear portion of the sleeve 6 is engaged within a thimble 11 which has its rear end inwardly flanged as indicated at 12 and rigidly engaged with the rear end of the spindle 3. Within the thimble 11, the sleeve 6 exteriorly carries two helical scales 13 having the same pitch as the threads of the spindle, sight openings 14 through which said scale may be read being provided in the thimble 11. The zero points of the scales 13 and that of the scale 9 are alined longitudinally of the sleeve.

The graduations of the scales 13 are such as to indicate the various points to which the sleeve 6 must be rotatively and longitudinally adjusted relative to the thimble 11 and the spindle 3 in order to relatively shift said sleeve and thimble a distance equal to any desired depth of thread, the indications of one of said scales being for U. S. standard screw threads, and those of the other for V-type threads, and the sight-openings being respectively marked U. S. and V to distinguish between the scales readable therethrough.

In the use of the above described instrument, there are two adjustments to be made if, as is usually the case, the given data include the pitch and outer diameter of the screw to be gaged but not the pitch diameter thereof. One of these adjustments consists in relatively rotating the sleeve 6 and thimble 11 until a number on one of the scales 13 indicating the desired pitch is registered with the corresponding opening 14. This has the effect of giving a reading on the scales 9 and 10 exceeding the corresponding spacing of the anvil and spindle by a distance equaling exactly the single depth of the desired thread. The other adjustment consists in rotating said sleeve and thimble in unison until the reading given by the scales 9 and 10 indicates the desired outer diameter for which a screw or bolt is to be gaged. It will be evident that after making both of these adjustments the anvil and spindle will be spaced a distance equal to the reading given by the scales 9 and 10 minus the reading through either of the windows 14, said distance being the desired pitch diameter but calculation of said distance being rendered unnecessary. Which of the two adjustments is first made is immaterial, although it may be somewhat more convenient to first adjust the sleeve 6 and thimble 11 relatively and subsequently adjust said parts in unison.

In using the above described instrument to gage a screw or bolt of known pitch diameter, the method followed might be the same as for an ordinary micrometer caliper, the sleeve and spindle being adjusted only in unison, the reading taken from the scales 9 and 10 being in such case that of the desired pitch diameter.

What I claim is:

1. A micrometer caliper comprising a yoke, an anvil and barrel respectively carried by said yoke, said barrel having a scale extending longitudinally thereon, a spindle adjustable in said barrel to or from the anvil, a sleeve embracing said barrel and carrying a scale reading in screw pitches, and a thimble rigidly engaged with said spindle and embracing said sleeve, the sleeve and thimble being relatively longitudinally adjustable to set the latter with reference to the scale on the former, and being adjustable in unison with the spindle and with reference to the scale on the barrel to set the spindle with relation to the anvil.

2. A micrometer caliper comprising a yoke, an anvil and barrel respectively carried by said yoke, said barrel having a scale extending longitudinally thereon, a spindle adjustable in said barrel to or from the anvil, a sleeve embracing said barrel and carrying a helical scale reading in screw pitches, said sleeve and spindle having engaged screw threaded portions, the pitch of which is also that of said helical scale, and a thimble rigidly engaged with said spindle and embracing said sleeve, the thimble being adapted to be set with reference to the scale on the sleeve through relative rotation of the sleeve and spindle, and the sleeve being adapted to be set with relation to the scale on the barrel through adjustment thereof in unison with the spindle.

3. A micrometer caliper comprising a yoke, an anvil and barrel respectively carried by said yoke, said barrel having a scale extending longitudinally thereon, a spindle adjustable in said barrel to or from the anvil, a sleeve embracing said barrel and carrying a helical scale reading in screw pitches, said sleeve and spindle having engaged screw-threaded portions, the pitch of which is also that of said helical scale, and a thimble rigidly engaged with said spindle and embracing said sleeve and formed with a sight window with which the indicia of the helical scale may be respectively registered through relative rotation of the sleeve and spindle, the sleeve being adapted to be set with reference to the scale on the barrel by adjustment of the sleeve in unison with the spindle.

4. A micrometer caliper comprising a yoke, an anvil and barrel respectively carried by said yoke, said barrel having a scale extending longitudinally thereon, a spindle screw-threaded in said barrel for adjustment by rotation to or from the anvil, a sleeve embracing said barrel and carrying a scale reading in screw-pitches, and a thimble rigidly engaged with said spindle and embracing said sleeve, the sleeve and thimble being relatively longitudinally adjustable to set the latter with reference to the scale on the former and being adjustable in unison with the spindle and with reference to the scale on the barrel to set the spindle with relation to the anvil.

5. A micrometer caliper comprising a yoke, an anvil and barrel respectively carried by said yoke, said barrel having a scale extending longitudinally thereon, a spindle screw-threaded in said barrel for adjustment by rotation to or from the anvil, a sleeve embracing said barrel and carrying a scale supplementing the scale on the barrel and further carrying a helical scale reading in screw pitches, the zero points of said scales being in alinement, said sleeve and spindle having engaged screw-threaded portions, the pitch of which is also that of said helical scale, and a thimble rigidly engaged with said spindle and embracing said sleeve, the thimble being adjusted to be set with reference to the helical scale on the sleeve through relative rotation of sleeve and spindle, and the sleeve being adapted to be set with relation to the scale on the barrel through adjustment thereof in unison with the spindle.

6. A micrometer caliper comprising a yoke, an anvil and barrel respectively carried by said yoke, said barrel having a scale extending longitudinally thereon, a spindle adjustable in said barrel to or from the anvil, two members comprising a sleeve embracing said barrel and a thimble rigidly engaged with said spindle and embracing said sleeve, one of said members having a scale thereon reading in screw pitches, said members being relatively adjustable longitudinally to set one with reference to the scale on the other of said members, and being adjustable in unison with the spindle and with reference to the scale on the barrel to set the spindle with relation to the anvil.

In testimony whereof I sign this specification.

LOWELL C. BLOMSTROM.